United States Patent [19]

Kent

[11] 4,357,754
[45] Nov. 9, 1982

[54] APPARATUS FOR ASCERTAINING INTERNAL DIMENSIONS OF A HOLLOW ARTICLE

[75] Inventor: William C. Kent, Garland, Tex.

[73] Assignee: Western Electric Company, Inc., New York, N.Y.

[21] Appl. No.: 245,404

[22] Filed: Mar. 19, 1981

[51] Int. Cl.³ ............................ G01B 5/14; G01B 7/14
[52] U.S. Cl. .............................. 33/148 H; 33/149 J; 33/174 PA
[58] Field of Search ............ 33/147 F, 147 K, 148 R, 33/148 E, 148 G, 148 H, 149 R, 149 B, 149 J, 174 L, 174 PA, 178 E

[56] References Cited

U.S. PATENT DOCUMENTS

| | | | |
|---|---|---|---|
| 2,220,280 | 11/1940 | Richards | 33/148 R |
| 2,378,334 | 6/1945 | Sirvent | 33/148 R |
| 3,162,954 | 12/1964 | Goehle | 33/148 R |
| 3,210,854 | 10/1965 | Wolfram et al. | 33/178 E |
| 3,716,789 | 2/1973 | Gearin | 324/158 F |
| 3,851,323 | 11/1974 | Eltgen | 340/679 |
| 4,068,170 | 1/1978 | Chayka et al. | 324/72.5 |
| 4,279,079 | 7/1981 | Gamberini et al. | 33/149 J |
| 4,291,466 | 9/1981 | Bell et al. | 33/148 H |

FOREIGN PATENT DOCUMENTS

| | | | |
|---|---|---|---|
| 87779 | 4/1921 | Switzerland | 33/148 R |
| 2033588 | 5/1980 | United Kingdom | 33/174 L |
| 179008 | 2/1966 | U.S.S.R. | 33/148 R |
| 215524 | 4/1968 | U.S.S.R. | 33/148 H |
| 247507 | 11/1969 | U.S.S.R. | 33/148 E |
| 642471 | 1/1979 | U.S.S.R. | 33/147 K |

Primary Examiner—Richard R. Stearns
Attorney, Agent, or Firm—R. P. Miller

[57] ABSTRACT

A connector (10) having a socket-like opening (11) to be gauged is advanced into position to receive two sets of upright sensing legs (26 and 27) of L-shaped levers (28 and 29). The levers are moved upwardly to position the sensing legs within the connector opening, whereafter the levers are pivoted under urging of springs (57 and 58) to move the legs in opposite directions toward the opposing walls of the connector opening. Movement of the levers are monitored by two banks of linear transformers (72 and 73) to generate signals to actuate a pair of displays (116 and 117) to provide visual representations of the profiles of the opposing walls of the connector opening.

5 Claims, 6 Drawing Figures

APPARATUS FOR ASCERTAINING INTERNAL DIMENSIONS OF A HOLLOW ARTICLE

FIELD OF THE INVENTION

This invention relates to apparatus for determining an internal dimensional characteristic of an article and, more particularly, to automated apparatus for ascertaining the profile of a pair of opposed walls of a channel-like slot formed in an article.

BACKGROUND OF THE INVENTION

In the manufacture of articles having internal cavities it is often necessary to determine whether or not the dimensions of the cavities are within prescribed limits for the production of satisfactory articles. One type of such article is an electrical connector having a channel-like opening into which extends two sets of contact portions of externally projecting terminals. These connectors are assembled with the channel-like opening functioning as a socket to receive a section of a printed circuit board having contact elements formed on the upper and lower surfaces along one edge thereof. If the connector is bowed so that the socket opening varies in wall spacings beyond certain limits, the individual terminal contact portions will not, or only weakly, engage the contact elements formed on the circuit board thus disrupting the integrity of any circuit continuity between the electrical components on the circuit board and the electrical equipment wired to the projecting terminals.

SUMMARY OF THE INVENTION

This invention contemplates, among other things, an automatic facility for measuring and visually indicating the distances between a number of locations on a pair of opposed walls formed in an article.

More particularly, the facility includes two sets of L-shaped levers having upright sections parallel to, but spaced from, each other on which are respectively formed sensing nubs so that the nubs on each set of levers project in opposite directions. An article, such as a connector, with a channel-like socket is supported above the upright sections of the levers. A pair of cam members engage and support the free ends of the horizontally extending sections of the L-shaped levers. The levers are pivotally supported by fulcrums projecting from the elbows of the levers that rest in indentations formed in a standard. The movements of the levers are sensed by moving cores within linear transformers which control a visual display to provide illuminated profiles of the opposed walls of the opening in the article.

In use of the automated facility, a connector is positioned with its socket opening facing the nubbed ends of the levers. The cam and pivot supports for the levers are advanced to move the nubbed ends of the levers into the connector opening, whereafter the cam members are operated to allow springs to pivot the levers to move the nubs into engagement with the opposed walls of the article cavity. The linear transformers respond by generating signals to actuate the indicating lights to provide a visual display of the profiles of the opposed walls.

In a preferred alternative for the particular application of measuring slot variations in connectors, each pair of associated linear transformers again respond to movements of each pair of L-shaped levers into engagement with opposed wall sections to generate signals representative of the distance between a centerline of the slot and a pair of opposed engaged wall sections. These signals may be analog signals that are added to provide a signal indicative of the width of the slot. This actual slot width signal is compared with a desired width signal to provide a signal that represents the total plus or minus variation from the normal width of the slot. This signal is used to operate a visual display to apprise an attending operator whether or not the slot is within prescribed limits. If the signal indicates that the slot is beyond prescribed limits, then a further signal may be generated to subsequently operate an ejector to remove the defective connector from the automated facility.

BRIEF DESCRIPTION OF THE DRAWINGS

A more comprehensive understanding of the features and advantages of the invention will be apparent upon consideration of the following detailed description when considered in conjunction with the accompanying drawings, wherein:

FIG. 6 is a schematic figure illustrating the preferred arrangement for indicating an out of tolerance measurement of a slot formed in the article.

DETAILED DESCRIPTION

Figure 1:
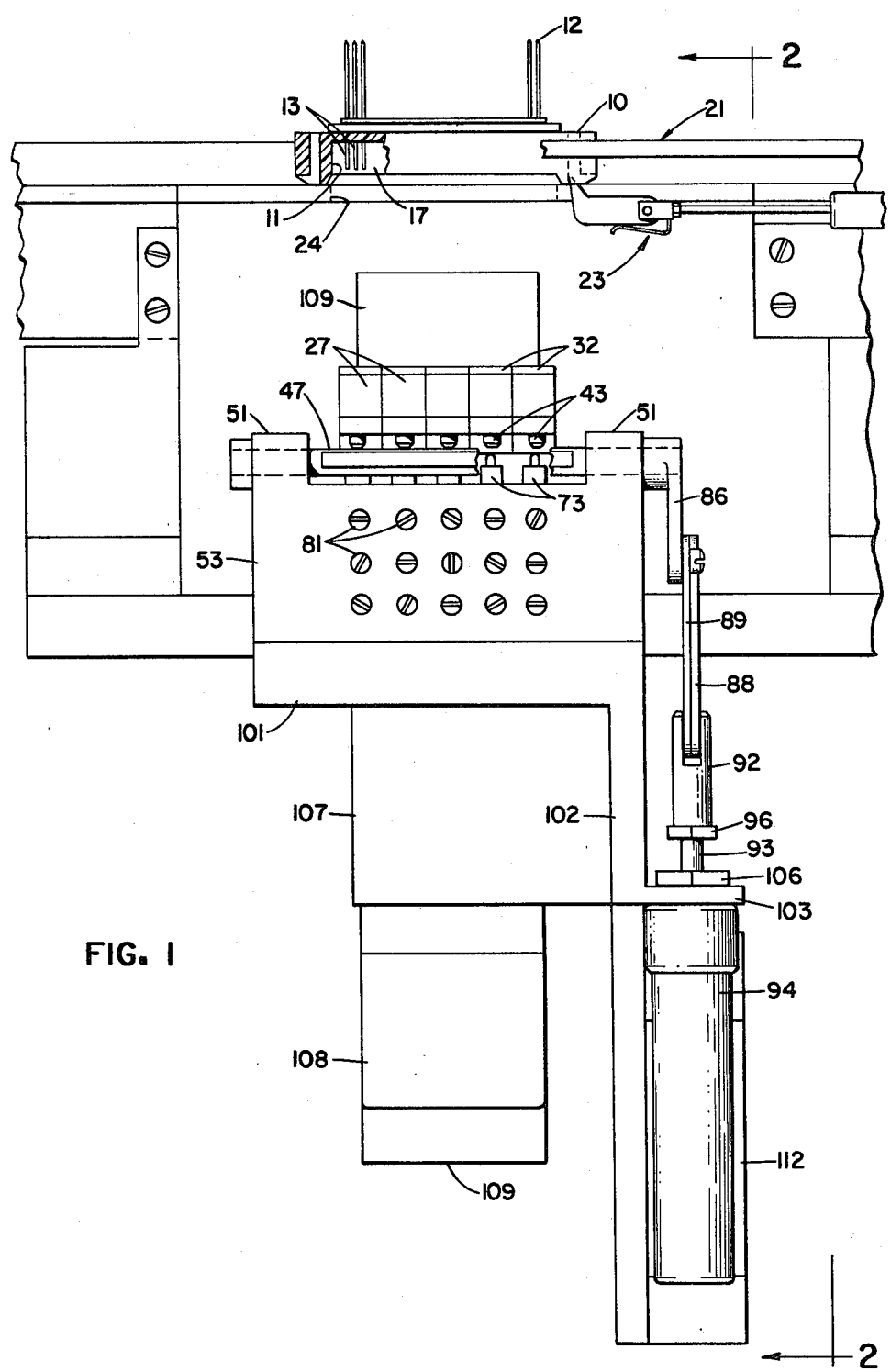
FIG. 1 is a front elevational view of a facility for measuring distances across an opening formed in an article in accordance with the principles of the present invention.
Figure 4:
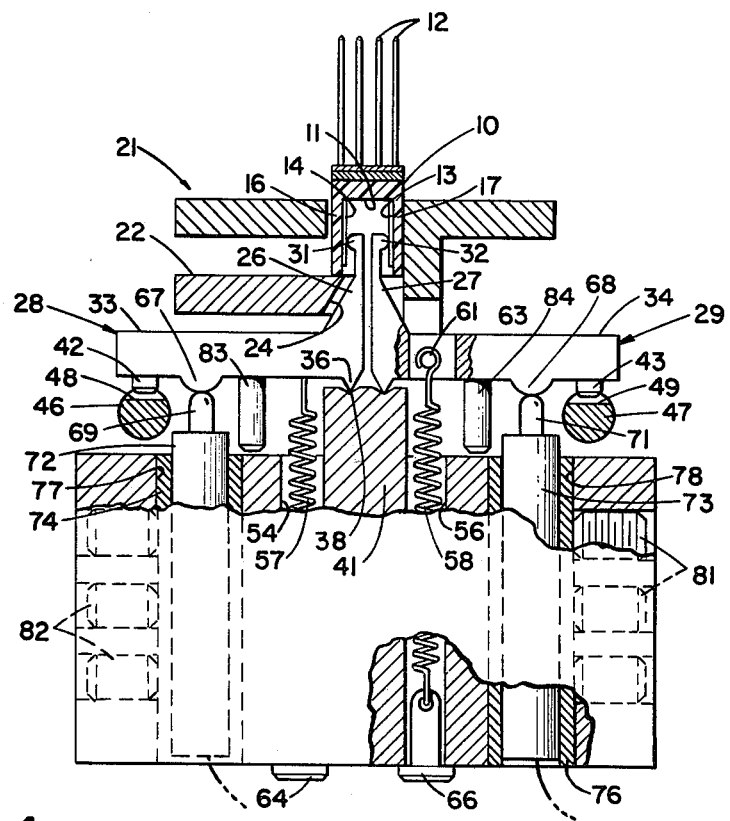
FIG. 4 is an enlarged side elevational view, partially cut away, and particularly depicting the mounting for the L-shaped levers and a pair of linear transformers for monitoring the movement of the levers and generating signals indicative of the positions of the levers upon being positioned in accordance with the profiles of the opposed walls of the opening in the article.

Referring first to FIGS. 1 and 4 for a consideration of a typical article having an opening which is to be measured or gauged by the apparatus of the present invention, there is shown a connector 10 having an elongated channel-like opening or socket 11. The connector includes a plurality of rows and columns of terminals 12 having two sets of contact ends 13 and 14 extending into and lying along opposed walls 16 and 17 of the opening. Connectors of this type are widely used in conjunction with arrays of contact pads or terminals along one edge of a printed circuit board.

In order to obtain uniform contact between the circuit board terminals and the connector contacts, it is necessary that the connector have parallel walls 16 and 17. If one or both of the walls are bowed outwardly, the center terminal contacts are not firmly engaged to the contact pads on the circuit board. If one or both of the walls are bowed inwardly, the center contacts will be engaged with an excessive force or the center contact pads may be engaged while the contacts at the opposite ends of the connector are not firmly engaged. It may be thus appreciated that in order to produce satisfactory connectors the channel-like openings 11 should be measured or gauged in order to detect any detrimental bowing condition.

The facility shown in the drawings is automated; that is, it is designed to cyclically check a series of connectors for the dimensions of the channel-like opening formed in each connector. More specifically, connectors 10 are supported in a trackway 21 having a bottom plate 22 along which the connectors are advanced in incremental fashion by any suitable means, such as the fluid cylinder operated pawl device 23 shown in FIG. 1. Each connector is advanced to align the channel-like opening 11 with a slot 24 formed in the slide plate 22. The walls of the slot 24 are beveled as shown in FIG. 4 to accommodate two sets of sensing fingers 26 and 27.

Figure 5:
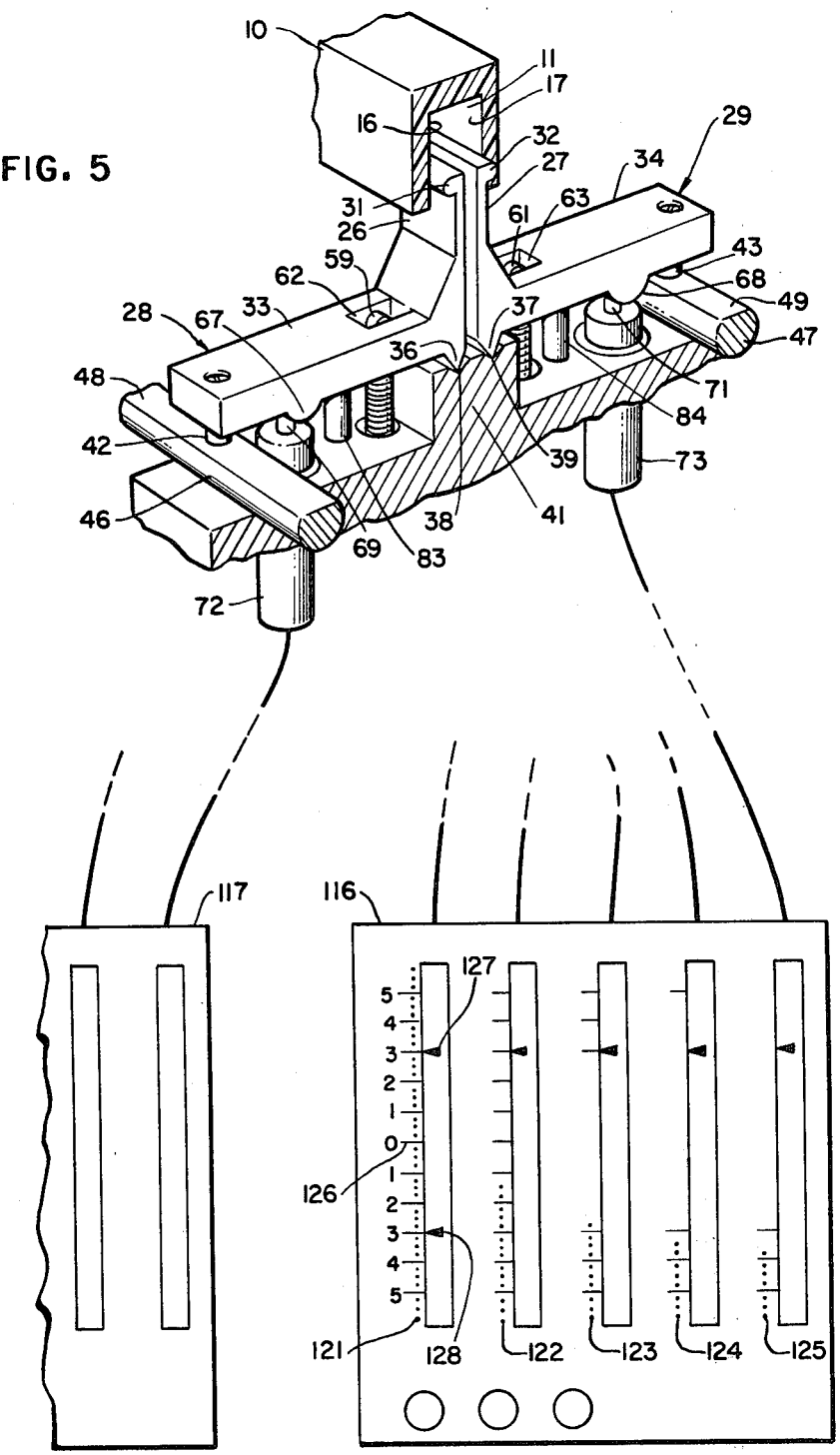
FIG. 5 is a schematic view, partially in perspective, illustrating a sensing operation by a pair of levers and a visual display operated by the linear transformers in response to a positioning of the sensing levers.

These sensing fingers 26 and 27 are formed as upright legs of two sets of L-shaped levers 28 and 29. As clearly shown in FIGS. 2, 4 and 5, each L-shaped lever comprises an upright leg or finger 26 or 27 having a projecting nub 31 or 32 and a horizontally extending leg 33 or 34. The elbow or juncture sections of the legs 33 and 34 have downwardly extending pointed fulcrums 36 and 37 resting in a pair of indentations 38 and 39 formed in a post or standard 41. As shown in FIGS. 4 and 5, the horizontal legs 28 and 29 are provided with downwardly projecting cam follower pins 42 and 43 which engage cams 46 and 47. The cams 46 and 47 are dowel shaped and formed with flats 48 and 49 which function as low portions of the cams. The opposite ends of the dowel cams 46 and 47 are rotatably mounted in pairs of bosses 51 and 52, see FIGS. 1 and 2, projecting upwardly from a support block 53.

The support block 53 as shown in FIG. 4 is provided with two sets of parallel bores 54 and 56 into which are mounted two sets of springs 57 and 58 having their upper ends secured to pins 59 and 61 extending across slots 62 and 63 (see FIG. 5) formed in the horizontal legs 33 and 34. The bottoms of the springs 57 and 58 are secured to capped retainers 64 and 66. These springs act to force the levers 28 and 29 to pivot about the fulcrums to move the cam followers 42 and 43 into engagement with and follow the peripheral surfaces of the cams 46 and 47. The arms 33 and 34 are also provided with protuberances 67 and 68 that rest against rod cores 69 and 71 extending into two sets of five linear transformers 72 and 73. Any movement of a core 69 or 71 causes the associated linear transformer 72 and 73 to react and produce a signal condition indicative of the movement of the core. These linear transformers are of commercial manufacture.

The sets of linear transformers 72 and 73 are mounted within split sleeves 74 and 76 located within bores 77 and 78 formed in the block 53. The sleeves 77 and 78 are slit so that they may be collapsed about the bodies of the linear transformers 72 and 73 by movement of two banks of set screws 81 and 82. The set screw and sleeve mounting arrangement allows for the easy replacement and initial setting of the linear transformers. The movement of the legs 33 and 34 to actuate the linear transformers is limited by two sets of depending stop pins 83 and 84 projecting from the individual legs to engage the top surface of the block 53.

Figure 2:
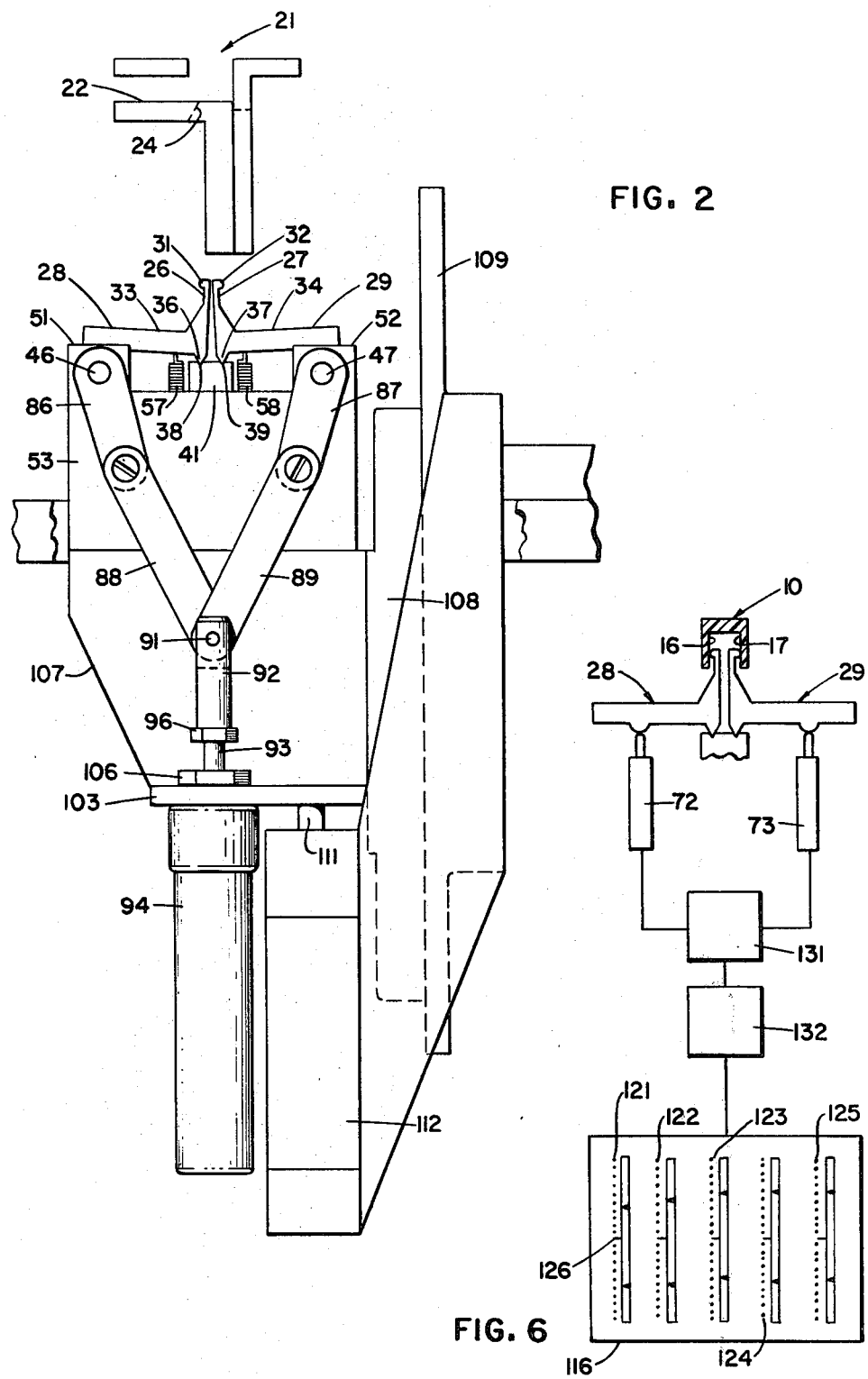
FIG. 2 is a side elevational view taken along line 2—2 of FIG. 1 showing two sets of L-shaped sensing levers and actuating mechanisms for measuring distances across the opening formed in the article.
Figure 3:
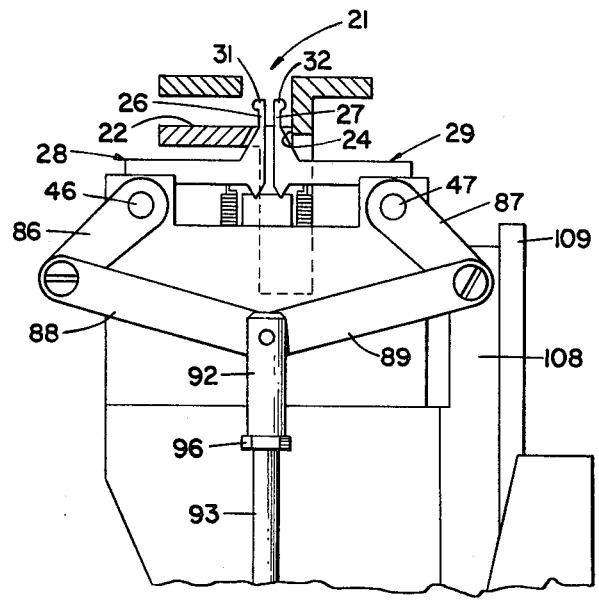
FIG. 3 is a partial view of the facility shown in FIG. 2 and illustrates the actuating mechanism in position to permit the L-shaped levers to move into sensing positions.

Normally the non-flat surface of the cams 46 and 47 engage the cam follower pins 42 and 43 to position the upright sensing legs 26 and 27 in close proximity to each other. As shown in FIGS. 2 and 3, the ends of the cam dowels 46 and 47 are fixed to a pair of links 86 and 87 which, in turn, are pivotally connected to a second pair of links 88 and 89. The lower ends of the links 88 and 89 are rotatably mounted on a pin 91. The pin 91 extends through bifurcations formed in a sleeve 92 that is internally threaded and engaged to a piston rod 93 extending from an air cylinder 94.

A lock nut 96 is provided to secure the sleeve 92 in place on the piston rod 93. When the air cylinder 94 is operated to drive the piston rod 93 upwardly, the links 86-89 will flex to the position shown in FIG. 3, in which instance the flats 48 and 49 on the dowel cams 47 and 48 are presented to the cam followers 42 and 43 (see also FIG. 4). The springs 57 and 58 are thus rendered effective to pivot the levers to move the upright legs 26 and 27 away from each other to move the nubs 31 and 32 into engagement with the opposed walls 16 and 17 of the slot 11 in the connector 10. The extent of pivoting movement of the L-shaped levers is indicative of the spacing between walls. As each left or right-hand lever is moved, its depending protuberance 67 or 68 is moved downwardly to depress the associated core 69 or 71, thus causing the linear transformers 72 and 73 to generate signals which are indicative of the spacing between the walls 13 and 14.

Considering now the mechanisms necessary to move the levers 28 and 29 within the slot 11 in the connector, it will be noted from FIG. 1 that the block 53 is mounted on a support plate 101. Plate 101 is formed with an intermediate section 102 that is connected to a lateral shelf section 103. The shelf 103 provides a mounting for the air cylinder 94 which is secured in place by a nut 106. The plate 101 is also connected to a block 107 that is mounted on a slide 108 that rides on a trackway guide 109. As shown in FIG. 2, the shelf sections 103 of the support plate is attached to a piston 111 extending from a hydraulic cylinder 112.

Operation of the hydraulic cylinder 112 moves piston rod 111 to move plate shelf 103 and the plate 101 in an upward direction as shown in FIGS. 1 and 2. Upward movement of the plate 101 is accompanied by like movement of the block 53 so that the levers 26 and 27 are moved upwardly to position the sensing nubs 31 and 32 within an opening 11 formed in the connector 10. Inasmuch as the dowels 46 and 47 are now positioned to present their high portions to the cam followers 42 and 43, the nubs 31 and 32 are held spaced from the opposing walls in the slot 11.

Upon completion of the upward movement of the block 53, the air cylinder 94 is operated to flex the linkage 86-89 to pivot the dowel cams 46 and 47 to present the flats 48 and 49 to the cam followers 42 and 43. Springs 57 and 58 are thus rendered effective to pivot the levers to move the two sets of nubs 31 and 32 into engagement with the opposed walls 16 and 17 of the slot 11. The cyclic control of the apparatus may be accomplished by a number of different expedients, such as commercially available programmed or sequence controllers or appropriate arrangements of limit switches that function to control a suitable relay circuit. As example of a controller that may be utilized in conjunction with the described apparatus is the PLC-Programmable Controller—Bulletin 1774 which may be obtained from the Allen-Bradley Corporation of Cleveland, Ohio.

The signals generated by the bank of linear transformers 73 are used to operate light emitting diodes of a display 116 shown in FIG. 5. In a like manner, the signals generated by the linear transformers 72 are utilized to illuminate light emitting diodes in a display 117. Display 116 is a commercially available display device and is sold along with the linear transformers as a Bendix Sheffield Electronic Column by the Bendix Corporation-Automation and Measurement Division, Dayton, Ohio. More particularly, there is a series of five columns of light emitting diodes 121-125 that are individually operated in accordance with the signals generated by the linear transformers 73. The controls for the light emitting diodes are set so that the center diode, e.g. 126, is illuminated when the L-shaped lever 29 pivots a predetermined amount to engage the nub 32 with a wall 17 that is of desired spacing from the centerline of the slot 11.

The display can be set so that lights are illuminated on either side of the diode 126 to denote the variation in the spacing of the wall 17 from the centerline. Markers 127 and 128 are provided for each column of diodes to designate the maximum amount of tolerances in the spacing of the wall from the centerline of the slot. The illumination of a light emitting diode 121 above the marker 127 indicates that the wall section is bowing outwardly beyond acceptable limits. Similarly, the illumination of a light emitting diode 121 below the marker 128 indicates that the wall section is bowed inwardly an excessive amount. Light emitting diodes associated with the other linear transformer 73 are illuminated so as to provide, in reality, a profile of the right-hand wall section of the slot 11. The display on device 117 is similar, but in this instance a profile is provided for the left-hand wall 16 of the slot 11.

Briefly in summary, the controller sequentially generates a series of signals which are effective to initially operate the feed device 23 to advance a connector 10 into alignment with the slot 24. The hydraulic cylinder 112 is then operated to lift the block 53 and the levers 28 and 29 to position the nubs 16 and 17 within the slot 11. Next, the air cylinder 94 is operated to flex the links 86–89 to rotate the cams 46 and 47, whereupon the flats 48 and 49 are presented to free the L-shaped sensing levers. The springs 57 and 58 pivot the levers to move the nubs 31 and 32 into engagement with the opposed walls. The protuberances 67 and 68 are moved downwardly to move the cores 69 and 71 within the linear transformers 72 and 73.

Each linear transformer generates a signal which controls the operation of a light emitting diode on the display 116 or 117. By reading the illuminated display of light emitting diodes, the attending operator is immediately apprises as to the satisfactory or unsatisfactory condition of the connector 10. Those connectors found to be unsatisfactory may be manually removed or automatically ejected by a mechanism, not shown. Upon completion of the sensing operation, the controller restores the air cylinder 94 and then the hydraulic cylinder 112 to the initial position as illustrated in FIG. 2 in anticipation of another cycle of operation.

In a preferred arrangement for rapidly obtaining an indication of an outer tolerance dimension of the slot formed in the connector 10, the outputs from each pair of associated linear transformers 72 and 73 are combined to control the operation of one LED in each electronic column. More particularly, referring to FIG. 6, the movement of a pair of associated levers 28 and 29 into engagement with a pair of opposed wall sections causing the associated linear transformers 72 and 73 to generate a pair of analog signals which are impressed on an adder circuit 131 to produce a signal indicative of the width of the slot at the points engaged by the pair of associated levers 28 and 29. This width of slot signal is applied to a comparator circuit 132 which matches this signal with respect to a standard signal indicative of desired width of the slot.

In this instance, the associated visual display 116 is set so that the center LED 126 of the first column 121 represents the receipt of a signal indicative of the desired width of the slot. If the signal from the comparator circuit 132 represents either a width greater or less than the desired width, the variation in width will accordingly cause the operation of a LED either above or below the center LED. It may be thus appreciated that each pair of levers 28 and 29 and associated linear transformers 72 and 73 control the operation of one LED in one column to indicate that the slot at the point engaged by the levers is at the exact desired width or at a dimension that is above or below the desired width. The display system may be arranged so that each column includes fifty LED's and that each fifth light above or below the center LED indicates a 1000th of an inch variation from the desired dimension. The adjustable pointers 127 and 128 are set along the columns of LED's to indicate the maximum amounts of variations that can be tolerated.

If a LED above or below the pointer is operated; that is, a detection of an out of limit condition, the attending operator will note that the connector being tested is defective, and upon subsequent advance of the connector out of the test position, will remove the defective connector. It is also contemplated that eject facilities, not shown, positioned down the trackway 21 can be operated by the signals that operate the LED's that are located outside the settings of the pointers 127 and 128. The occurrence of an operation of any LED in any column outside the pointer range may be utilized with the programmable controller to control the automated ejection of a connector at a time subsequent to the advance of the connector from the slot width test station.

What is claimed is:

1. An apparatus for measuring the distance across an opening in an article, which comprises:
   a pair of L-shaped levers having upright legs with oppositely projecting nubs extending away from each other, and horizontal legs extending in opposite directions, said levers having fulcrums extending from the juncture of said lever legs;
   a support standard having a pair of spaced indentations for receiving said fulcrums;
   a pair of movably mounted cams having low and high surfaces for supporting the free ends of the horizontal legs;
   means for supporting an article with the opening therein facing the ends of said upright legs;
   means for moving the cams, the support standard and levers toward said supported article to position said upright legs within the opening of the supported article;
   means for moving the cams to move the high surfaces from positions supporting the levers and for presenting the low surfaces to support the levers;
   means urging the levers to follow the cam surfaces and thus pivot the levers about said fulcrum to move the nubs on the upright legs into engagement with the opposite sections of the wall defining the opening in the supported article; and means for visually displaying the extent of movement of said levers required to engage said nubs with the opposite wall sections of the opening.

2. An apparatus for indicating the spacing between opposed walls of an opening formed in an article, which comprises:
- a first set of parallel levers having sensing nubs projecting from first end sections thereof;
- a second set of parallel levers having sensing nubs projecting from said first end sections thereof;
- means for pivotally mounting said first and second set of levers with the nubs on the respective levers projecting in opposite directions;
- means for supporting the second end sections of said sets of levers to position the first end sections in close proximity to each other;
- means for positioning the article with the opening therein facing the first end sections of said sets of levers;
- means for moving said mounting and supporting means to advance the first end sections of said levers into the opening in the article;
- means rendered effective upon advance of the sets of levers into the opening for moving the supporting means from the second end sections of said sets of levers;
- means rendered effective upon removal of said supporting means for pivoting said levers to move said first end sections away from each other to move said nubs into engagement with the opposed walls of the opening in the article; and
- means for individually indicating the amount of movement of each of said levers to provide an indication of the spacing between the opposed walls.

3. An apparatus for gauging the distance between a number of locations on a pair of opposed walls defining an opening in an article, which comprises:
- a support block having a standard projecting therefrom which is provided with a pair of spaced indentations;
- two sets of L-shaped levers having upright legs, horizontal legs and fulcrum members projecting from elbow sections joining the legs;
- springs mounted to the block for holding the L-shaped levers with the fulcrum members within the respective indentations;
- a pair of cams mounted on the block having high sections for engaging the horizontal legs to position said horizontal legs against the action of the springs;
- a linkage mounted to the block for moving the cams to move the high sections from the levers to render the spring effective to pivot the levers;
- means for positioning an article with an opening therein in alignment with the upper ends of the upright legs of the levers;
- means for moving said support block to advance the upright legs into the opening in the positioned article;
- means operated upon advance of the block for actuating said linkage to move said cams to release said levers and render said springs effective to pivot said levers to move the upright legs into engagement with the opposing walls of the opening in the article;
- means responsive to the movement of said levers for generating signals indicative of the movement of the levers; and
- a pair of display devices operated by said signals for presenting a visual display of the profile of the opposing walls of the opening in the article.

4. An apparatus for measuring the distance between a pair of opposed walls of an opening formed in an article, which comprises:
- a pair of L-shaped lever members having fulcrum members projecting from the elbow sections of the levers;
- a member having a pair of indentations for receiving said fulcrums to pivotally mount said lever members intermediate of the ends thereof;
- means for supporting first ends of said levers to position the second ends of the levers in close proximity to each other;
- means for holding the article spaced from said first ends of said lever members with the opening facing said first ends;
- means for imparting a relative motion between said mounting means and said holding means to position said first ends within the opening in the article;
- means for moving said supporting means and pivoting the lever members to engage the opposed walls of the opening; and
- means responsive to the pivotal movement of each lever member for indicating the distance between said walls.

5. An apparatus for measuring the distance between a pair of opposed walls of an opening formed in an article, which comprises:
- a pair of L-shaped lever members with upright legs projecting in a common first direction and horizontal legs projecting in opposite directions, and said lever members having pointed fulcrums projecting outwardly from junctures between the horizontal and upright legs;
- means for pivotally mounting said lever members intermediate of the ends thereof, said mounting means including a member with a pair of spaced indentations for receiving said fulcrums and positioning said horizontal legs in alignment with each other;
- means for supporting first ends of said levers to position the second ends of the levers in close proximity to each other;
- means for holding the article spaced from said first ends of said lever members with the opening facing said first ends;
- means for imparting a relative motion between said mounting means and said holding means to position said first ends within the opening in the article;
- means for moving said supporting means and pivoting the lever members to engage the opposed walls of the opening; and
- means responsive to the pivotal movement of each lever member for indicating the distance between said walls.

* * * * *